Patented Mar. 16, 1948

2,437,985

UNITED STATES PATENT OFFICE 2,437,985

PRODUCTION OF THIOKETONES

De Loss E. Winkler, Berkeley, and Seaver A. Ballard, Oakland, Calif., assignors to Shell Development Company, San Francisco, Calif., a corporation of Delaware No Drawing. Application June 16, 1944,
Serial No. 540,750

14 Claims. (Cl. 260—607)

This invention relates to a process for the production of thioketones which comprises reacting ketones with hydrogen sulfide in the presence of a dehydration catalyst. More particularly the invention provides a method for the production of a thioketone by reacting a ketone with hydrogen sulfide in the presence of a metal oxide dehydration catalyst at an elevated temperature.

An object of the invention is to produce thioketones which may serve a variety of useful purposes as insecticides, fungicides, parasiticides and as constituents of insecticidal, fungicidal and parasiticidal compositions. They are also useful as intermediates in organic syntheses, as reagents in the textile industry and in the petroleum industry. The thioketones are particularly valuable as solvents, plasticizers, and as additives to or reactants in the formation of synthetic resins, plastics and synthetic rubbers, etc.

The ketone which may be reacted according to the process of the invention may be cyclic or acyclic, saturated or unsaturated, and when the ketone is acyclic, it may be a symmetrical or mixed ketone. A group of ketones which have been found particularly suitable for reaction with hydrogen sulfide according to the process of the invention is that group which contains the cyclic ketones, namely, those ketones having a carbonyl carbon atom embraced in the cycle which may be saturated or unsaturated. For example, suitable cyclic ketones are isophorone, cyclohexanone, cyclohexenone, the methyl cyclohexanones, the methyl cyclohexenones (e. g. 3-methyl cyclohexen-2-one), the dimethyl cyclohexanones, the dimethyl cyclohexenones, the trimethyl cyclohexanones, the trimethyl cyclohexenones, 3,3,5-triethyl cyclohexenone, 3,3,5-triisopropyl cyclohexenone, cyclopentenone, cyclopentanone, cyclobutenone, cyclobutanone, camphor, fenchone, isothujone, menthone, carvomenthone, pulegone, carvone, eucarvone, cyclopentadecanone, dibenzalcyclohexanone, quinone, cyclohexandione-1,3, methone, angustione, triquinoyl and the like and their homologues. The process of the invention may also be used to replace by a sulfur atom the carbonyl oxygen atoms of heterocyclic compounds which also contain a carbonyl carbon atom embraced in the cycle, for example the pyrones, pyridones, coumarins, indigo, oxindoles, isatin, chromone, flavone, etc.

Representative acyclic ketones which may be employed in the execution of the process of the invention are those which have attached to the carbonyl carbon atom two monovalent hydrocarbon or substituted hydrocarbon radicals which may be the same or different and may be selected from the group comprising the alkyl, alkenyl, aryl, alkaryl, alkenaryl, aralkyl, aralkenyl, cycloalkanyl, polyalkylcycloalkyl, cycloalkenyl, polyalkylcycloalkenyl and heterocyclic radicals, and their derivatives substituted by halogen, ester, ether and other groups which will not interfere with the reaction. Representative acyclic ketones which may be used include acetone, methyl ethyl ketone, diisopropyl ketone, methyl n-butyl ketone, methyl isobutyl ketone, methyl tertiary butyl ketone, diisobutyl ketone, pinacolone, pivalone, ethyl benzyl ketone, mesityl oxide, methyl vinyl ketone, methyl isopropenyl ketone, methyl cyclopentenyl ketone, methyl furfuryl ketone, benzophenone, benzil and the like and their homologues and suitable substitution products. Ketones which may be employed in the process of the invention contain from 3 to 20 carbon atoms.

The invention may be executed in any suitable type of apparatus, and the process may be carried out in a batchwise, intermittent or continuous manner. The reaction of the ketone with hydrogen sulfide has been found to produce substantial yields of thioketone at atmospheric pressure, but elevated or reduced pressures may be employed if desired. For many ketones, superatmospheric pressures may be found satisfactory. Any superatmospheric pressure may be used, but pressures of about 10 to 20 atmospheres are in general efficient. However, in some cases it may prove desirable to use atmospheric pressure, or perhaps in some cases reduced pressures, for it has been found that for some cyclic ketones, particularly the 3,3,5-trisubstituted cyclohexenones, pressures above atmospheric decrease the conversion to thioketones by increasing the formation of by-products. For example, when isophorone is reacted with hydrogen sulfide in the presence of an activated bauxite to produce thioisophorone, pressures above atmospheric decrease the yield of thioisophorone and increase the amount of thioxylenol formed. The reaction may be carried out in the liquid or vapor phase, although the vapor phase is preferred for higher yields in most cases.

Any elevated temperature may be used in the execution of the process of the invention, but in order to provide a reaction rate which is sufficiently high, and to bring about the production of more substantial yields, a temperature is desired at least high enough to bring the ketone into the vapor phase, but below that temperature which will bring about substantial decomposition of the reactants and/or products. In general, temperatures of about 300° C. to about 600° C. are preferred. In many cases, e. g. in the formation of cyclic thioketones, temperatures of about 350° C. to about 500° C. may be found most convenient and effective.

The hydrogen sulfide and the ketone may be reacted in any proportion, but for the sake of efficiency, it is generally desirable to use a molar excess of hydrogen sulfide over the ketone. A mole ratio of hydrogen sulfide to ketone of about 1:1 to about 8:1 will produce satisfactory results, although higher or lower mole ratios may be used. Mole ratios of hydrogen sulfide to ketone of about 3:1 to about 5:1 have been found effective in some cases.

Any convenient and practical flow rate may be employed. Combined ketone plus hydrogen-sulfide flows of about 20 to 80 moles per liter of catalyst per hour have been found satisfactory; however, higher or lower flow rates may be used.

The reaction is preferably executed in the presence of a dehydration catalyst. The dehydration catalysts which may be used in the execution of the process of the invention are preferably selected from the group comprising the metal oxides such as aluminum oxide, thorium oxide, zirconium oxide, zinc oxide, iron oxide, chromium oxide, manganese oxide, magnesium oxide, calcium oxide, barium oxide, etc. The catalyst may be a solid substance which has an active surface due to its chemical nature and/or to its degree of subdivision or amount of available reaction surface. The catalyst may be in the form of a fine powder, in the form of pellets or other formed pieces of suitable size, or it may be in the form of fragments of suitable size. Single catalysts or mixtures of different catalysts may be employed, and they may be used with or without promoters and/or active or inert supports such as pumice, silica gel, activated charcoal, kieselguhr, etc. It has been found that catalysts containing a substantial amount of aluminum oxide are particularly suitable for effecting the reaction of ketones with hydrogen sulfide in accordance with the process of the invention. Especially suitable is a catalyst consisting of or comprising an activated alumina, i. e. an adsorptive alumina, which consists predominantly of alumina alpha monohydrate and/or gamma alumina, and which may or may not be impregnated with or contain some other suitable substance, e. g. activated alumina impregnated with lesser amounts of ferric oxide. Alumina catalysts which are characterized by their highly active adsorptive properties may be obtained from natural sources or they may be prepared by synthetic means. An efficient catalyst may be prepared by treatment of natural bauxite ore. It is generally known that bauxites have different physical and chemical characteristics, depending upon the locale from which they are obtained and upon the subsequent treatment accorded them. For example, the calcination temperature has a decided effect on the surface area and the adsorptive capacity of the resultant catalyst; the iron which is present may be capable of removal by magnetic methods, so the iron content may vary within wide limits, depending on the specific treatment; and the water content of a bauxite varies according to the degree of calcination employed. Granular activated bauxites are particularly efficient and in fact comprise one of the preferred catalysts to be employed in the present process, not only because they result in highly improved yields, but also because of the considerably lower cost of such bauxites. Granular activated bauxite possesses a long catalyst life as well as the ability to bring about excellent conversions to the thioketone product. Granular activated bauxite, as well as the adsorptive aluminas having the same general physical and chemical characteristics, are particularly suitable as catalysts for the reaction of hydrogen sulfide with a ketone to produce a thioketone according to the process of the invention.

Other suitable catalysts consist of or comprise adsorptive aluminas prepared by synthetic means. These synthetic aluminas may be prepared from gels which may be peptized or unpeptized, but they are preferably prepared from the crystalline form such as the crystalline alpha alumina trihydrate crystallized from alkali aluminate solutions. A variety of suitable means for activating alumina are in existence, such as the ones described in U. S. Patents 1,868,869 and 2,015,593. The process of U. S. Patent 1,868,869 comprises subjecting to calcination, at a temperature of from 300° C. to 800° C., the deposit which forms in the precipitation tanks and discharge pipes used in the execution of the Fickes-Sherwin modification of the Bayer process. Other suitable methods of preparing and activating the alumina catalyst will be apparent to those skilled in the art.

As has been stated above, if desired, a catalyst may be used comprising an activated alumina and some other suitable metal or metal compound such as the metal oxides mentioned above which may or may not be in chemical combination with the activated alumina on the surface thereof. Some of these catalysts may be prepared by direct impregnation of the activated alumina with a solution of the compound which it is desired to incorporate in the surface thereof, while others can only be prepared indirectly, for example, by impregnation with one compound followed by a conversion treatment whereby said compound is converted to the desired compound. Particularly suitable compound catalysts are those comprising an activated alumina and one or more iron oxides, and they comprise one of the preferred catalysts to be employed in the execution of the process of the invention.

The reaction may be allowed to take place for any suitable length of time. Durations of from about one hour to about six hours are generally suitable, although longer or shorter runs may be desirable in some cases. The duration of the run may vary somewhat depending upon the reactants and upon the temperature and pressure conditions maintained.

The reaction may be interrupted at any convenient point to introduce fresh catalyst, or to permit regeneration of the used catalyst which may be accomplished by any suitable known method. For example, any carbonaceous deposits which may be formed during the reaction may be burned off according to customary procedures.

The following examples serve to illustrate the execution of the process of the invention.

*Example I*

Hydrogen sulfide and isophorone in about a 4:1 mole ratio were reacted over granular activated bauxite at a temperature of about 500° C. at approximately atmospheric pressure and at a combined flow of about 50 moles per liter of catalyst per hour. About 15% of the recovered product comprised thioisophorone, about 5% was thioxylenol, and the remainder of the recovered product was largely unreacted isophorone and xylenol. The thioisophorone produced has a boiling point of about 105° C. to 107° C. at 20 mm.

Example II

Hydrogen sulfide and diisobutyl ketone were reacted in about a 4:1 mole ratio over granular activated bauxite at a temperature of about 450° C. at approximately atmospheric pressure and at a combined flow rate of about 50 moles per liter of catalyst per hour. From the product was recovered thiodiisobutyl ketone, having a boiling point of about 80° C. to 82° C. at 20 mm.

Example III

A feed of cyclohexanone and hydrogen sulfide in about a 1:4 mole ratio was passed over activated alumina at a temperature of about 450° C. at approximately atmospheric pressure and at a combined flow rate of about 50 moles per liter of catalyst per hour. A good yield of thiocyclohexanone was obtained.

Example IV

A feed containing about a 4:1 mole ratio of hydrogen sulfide and a $C_{12}$ ketone obtained as a by-product in the production of isophorone by the alkali catalyzed condensation of acetone was passed over granular activated bauxite at a temperature of about 500° C. at approximately atmospheric pressure and at a combined flow of about 50 moles per liter of catalyst per hour. The product contained about 14% of thioketone.

Numerous other thioketones which may be prepared according to the process of this invention include thioacetone, diethyl thioketone, methyl ethyl thioketone, methyl isopropyl thioketone, methyl isobutyl thioketone, ethyl isopropyl thioketone, diisopropyl thioketone, methyl amyl thioketone, ethyl isoamyl thioketone, thiopinacolone, thiopivalone, methyl cyclohexyl thioketone, methyl cyclohexenyl thioketone, ethyl pentenyl thioketone, propyl butadienyl thioketone, ethyl benzyl thioketone, methyl phenyl thioketone, methyl isobutenyl thioketone, methyl vinyl thioketone, methyl isopropenyl thioketone, diallyl thioketone, methyl furfuryl thioketone, thiobenzophenone, thiocyclohexanone, thiocyclohexenone, the methyl thiocyclohexanones (e. g. 3-methyl thiocyclohexene-2-one), the methyl thiocyclohexenones, the dimethyl thiocyclohexanones, the dimethyl thiocyclohexenones, the trimethyl thiocyclohexanones, the trimethyl thiocyclohexenones, thiocyclopentenone, 2-methyl thiocyclopentene-2-one, thiocyclopentanone, 3-methyl thiocyclopentanone, thiocyclobutenone, thiocyclobutanone, 3,3,5-triethyl thiocyclohexenone, 3,3,5-tripropyl thiocyclohexenone, 3,3,5-triisopropyl thiocyclohexenone, 3,3-dimethyl-5-ethyl thiocyclohexenone, 3-methyl-3,5-diethyl thiocyclohexenone, thiocyclopentadecanone, thiodibenzalcyclohexanone, thioeucarvone, thiomenthone, thiocarvomenthone, thiopulegone, thiocarvone and the like and their homologues.

We claim as our invention:

1. A process for the production of thioisophorone which comprises reacting isophorone with hydrogen sulfide in the presence of an activated bauxite at a temperature of about 500° C.

2. A process for the production of diisobutyl thioketone which comprises reacting diisobutyl ketone with hydrogen sulfide in the presence of a catalyst comprising activated alumina at a temperature between about 350° C. and about 500° C.

3. A process for the production of thioisophorone which comprises reacting isophorone with hydrogen sulfide in the presence of a catalyst comprising crystalline alumina alpha monohydrate prepared by partial dehydration of crystalline alpha alumina trihydrate crystallized from alkali aluminate solutions, at a temperature between about 350° C. and about 500° C.

4. A process for the production of a 3,3,5-trialkyl thiocyclohexenone which comprises reacting a 3,3,5-trialkyl cyclohexenone with hydrogen sulfide in the presence of an activated bauxite at a temperature between about 350° C. and about 500° C.

5. A process for the production of a 3,3,5-trialkyl thiocyclohexenone which comprises reacting a 3,3,5-trialkyl cyclohexenone with hydrogen sulfide in the presence of a catalyst comprising an activated alumina at a temperature between about 350° C. and about 500° C.

6. A process for the production of an unsaturated alicyclic thioketone which comprises reacting an unsaturated alicyclic ketone wherein the carbonyl carbon atom is one of the carbon atoms of an alicyclic ring and which in addition to the carbonyl radical contains only carbon and hydrogen atoms with hydrogen sulfide in the presence of a catalyst comprising activated alumina at a temperature between about 350° C. and about 500° C.

7. A process for the production of an aliphatic thioketone which comprises reacting an aliphatic ketone having the carbonyl group attached to two monovalent aliphatic hydrocarbon radicals with hydrogen sulfide in the presence of a catalyst comprising an activated alumina at a temperature between about 300° C. and about 600° C.

8. A process for the production of an alicyclic thioketone which comprises reacting an alicyclic ketone wherein the carbonyl carbon atom is one of the carbon atoms of an alicyclic ring and which in addition to the carbonyl radical contains only carbon and hydrogen atoms with hydrogen sulfide in the presence of a catalyst comprising an activated alumina at a temperature between about 300° C. and about 600° C.

9. A process for the production of an alicyclic thioketone which comprises reacting an alicyclic ketone wherein the carbonyl carbon atom is one of the carbon atoms of an alicyclic ring and which in addition to the carbonyl radical contains only carbon and hydrogen atoms in the vapor phase with hydrogen sulfide in the presence of a catalyst comprising an activated alumina.

10. A process for the production of a thioketone which comprises reacting a ketone containing from 3 to 20 carbon atoms which in addition to the carbonyl radical contains only carbon and hydrogen atoms in the vapor phase with hydrogen sulfide in the presence of a catalyst comprising an activated alumina.

11. A process for the production of a thioketone which comprises reacting a ketone containing from 3 to 20 carbon atoms which in addition to the carbonyl radical contains only carbon and hydrogen atoms with hydrogen sulfide in the presence of a catalyst comprising activated alumina.

12. A process for the production of a thioketone which comprises reacting a ketone containing from 3 to 20 carbon atoms which in addition to the carbonyl radical contains only carbon and hydrogen atoms with hydrogen sulfide in the presence of a catalyst comprising aluminum oxide.

13. A process for the production of a thioketone which comprises reacting a ketone containing from 3 to 20 carbon atoms which in addition to the carbonyl radical contains only carbon and hydrogen atoms with hydrogen sulfide in the presence of a metal oxide dehydration catalyst.

14. A process which comprises reacting isophorone with hydrogen sulfide in the presence of a metal oxide dehydration catalyst at a temperature between about 350° C. and about 500° C.

DE LOSS E. WINKLER.
SEAVER A. BALLARD.

REFERENCES CITED

The following references are of record in the file of this patent:

Kretov et al., "Jour. Gen. Chem." (U. S. S. R.), vol. 5, pages 388–91 (1935).

Sen, "Jour. Indian Chem. Soc.," vol. 13, pages 268–72 (1936).

Sen, "Jour. Indian Chem. Soc.," vol. 12, pages 647–52 (1935).